United States Patent [19]

Teraoka et al.

[11] Patent Number: 4,782,720
[45] Date of Patent: Nov. 8, 1988

[54] POWER TRANSMISSION UNIT

[75] Inventors: Masao Teraoka; Sakuo Kurihara, both of Sano; Yukio Yuhashi, Kitasaitama, all of Japan

[73] Assignee: Tochigifujisangyo Kabushikigaisha, Japan

[21] Appl. No.: 90,414

[22] Filed: Aug. 27, 1987

Related U.S. Application Data

[63] Continuation of Ser. No. 796,860, Nov. 12, 1985, abandoned.

[51] Int. Cl.$^4$ .................. F16H 35/04; F16D 43/04; F16D 43/30
[52] U.S. Cl. ........................... 74/650; 192/35; 192/48.8; 192/50; 192/93 A
[58] Field of Search ........... 192/36, 48.8, 50, 93 A, 192/54, 35; 74/650

[56] References Cited

U.S. PATENT DOCUMENTS

| | | | |
|---|---|---|---|
| 849,474 | 4/1907 | Hedgeland | 192/50 X |
| 905,244 | 12/1908 | Stewart | 192/93 A X |
| 906,017 | 12/1908 | Hedgeland | 192/50 X |
| 1,141,839 | 6/1915 | Settergren | 192/50 |
| 1,254,540 | 1/1918 | Ruden | 74/650 |
| 1,301,800 | 4/1919 | Aichele | 74/650 |
| 2,385,864 | 10/1945 | Knoblock | 74/650 |
| 2,888,114 | 5/1959 | Bostock | 192/36 X |
| 3,310,997 | 3/1967 | Biddle | 192/50 X |
| 3,447,396 | 6/1969 | Seliger | 192/50 X |
| 4,400,996 | 8/1983 | Schou | 74/650 |
| 4,433,766 | 2/1984 | Teraoka | 192/50 |
| 4,462,272 | 7/1984 | Roper | 192/93 A X |
| 4,560,056 | 12/1985 | Stockton | 192/48.8 X |

FOREIGN PATENT DOCUMENTS

| | | | |
|---|---|---|---|
| 1384602 | 11/1964 | France | 74/650 |
| 184322 | 10/1983 | Japan . | |

Primary Examiner—Rodney H. Bonck
Attorney, Agent, or Firm—Samuels, Gauthier, Stevens & Kehoe

[57] ABSTRACT

There is provided a power transmission unit comprising an input member for receiving a torque input from a ring gear connected to a drive pinion which is connected to a propeller shaft, first and second output members supported by the input member in a freely rotatable manner and engaged with right and left rear wheels, and first and second clutches arranged between the input member and the first and second output members respectively to release the connections between the input member and the first and second output members respectively with the help of the actions of cam devices for releasing clutches when the angular speed of the input member becomes smaller than those of the first and second output members.

5 Claims, 18 Drawing Sheets

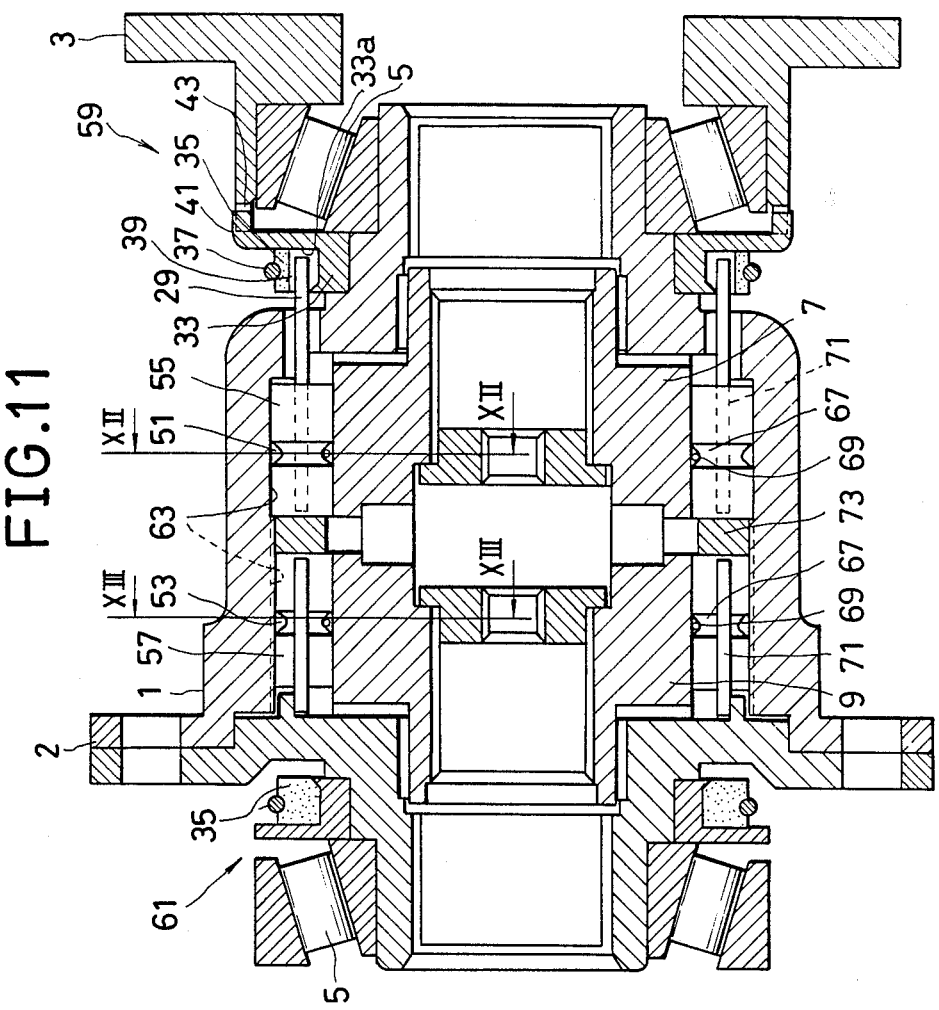

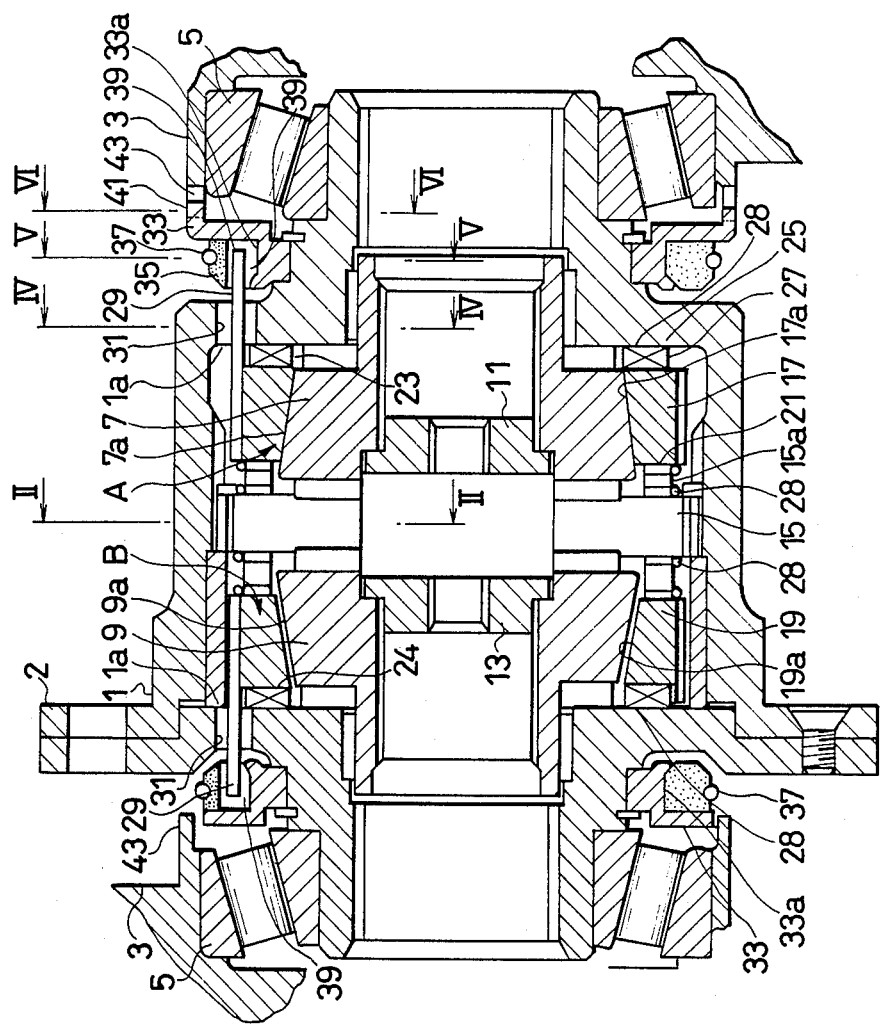

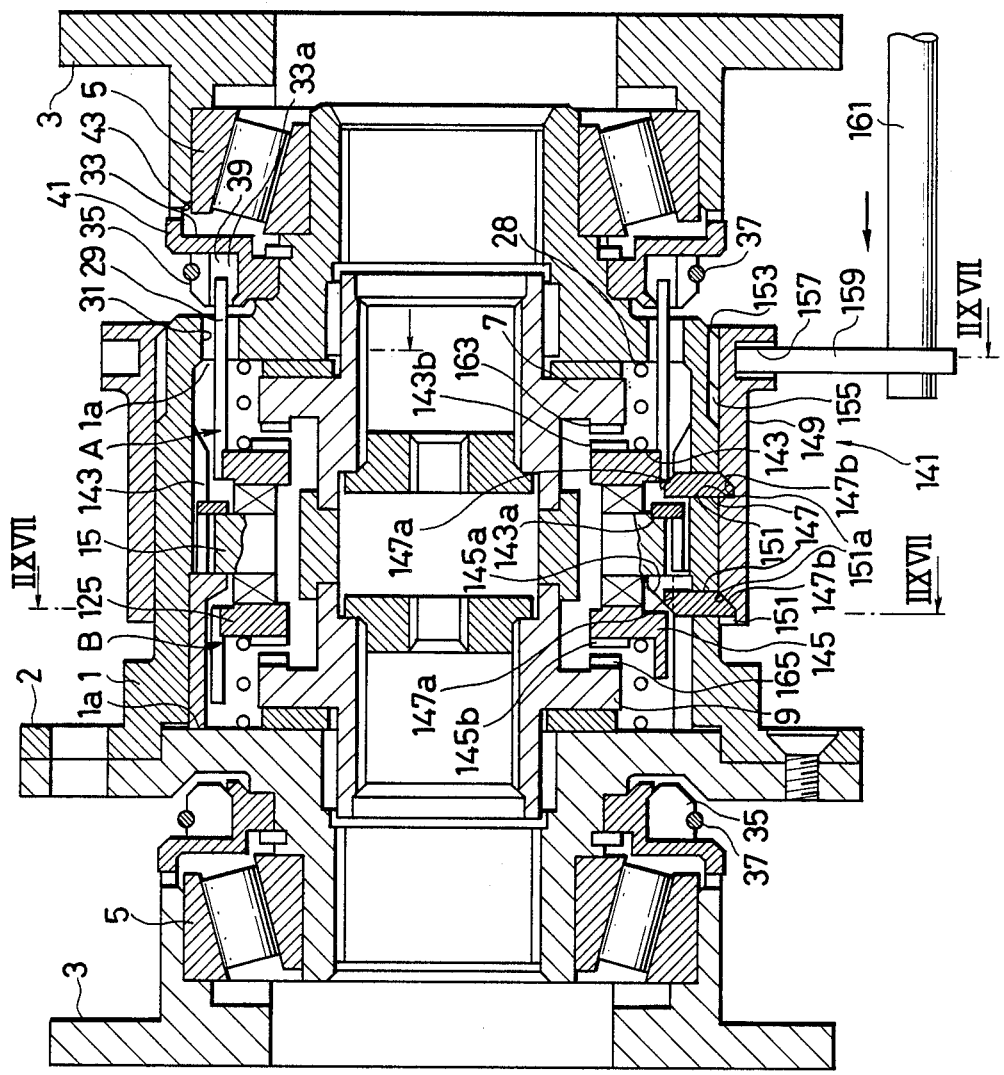

POWER TRANSMISSION UNIT

This is a continuation of co-pending application Ser. No. 796,860 filed on Nov. 12, 1985 now abandoned.

BACKGROUND OF THE INVENTION

1. Field of the Invention

The present invention relates to a power transmission unit arranged between rear wheel axles of, for instance, an FF (Front engine Front drive) part-time 4-wheel drive vehicle.

2. Description of the Prior Art

A prior art power transmission unit of this kind is disclosed in Japanese Patent Publication No. 58-184322. In this prior art power transmission unit, there are provided clutches between an input member for receiving a torque input and first and second output members comprising rotation shafts. In normal driving, the torque input is transmitted from the input member to the output members through the clutches, while, if one wheel goes into muddy soil and the other on a paved road, the driving force of the input member may be transmitted to, for instance, the first output member which corresponds to the wheel on the paved road. In cornering, a clutch corresponding to an outer wheel is automatically disconnected according to the increase of the angular speed of the outer wheel to cause, for instance, the second output member which corresponds to the outer wheel to idle.

In the prior art power transmission unit, however, the input member and the output members are kept connected through the clutches so long as no difference is caused between the angular speeds of the first and second output members. As a result, if the prior art power transmission unit installed between rear wheel axles of, for instance, an FF part-time 4-wheel drive vehicle is operated in a 2-wheel driving mode, the connection between an engine and the input member may be cut by disconnecting a clutch for selecting the 2-wheel drive and 4-wheel drive modes, but extremely large running resistance is applied for the vehicle because the rotation of rear wheels rotate the propeller shaft through the first and second output members and the input member. Accordingly, this kind of power transmission unit requires hub clutches for the rear wheels.

SUMMARY OF THE INVENTION

An object of the present invention is to provide a power transmission unit which has functions of a differential limiting type differential gear and a hub clutch which can automatically be connected and disconnected.

Another object of the present invention is to provide a power transmission unit in which a member for supporting an input member is applied with no abnormal force so that the durability of the unit may be improved.

A third object of the present invention is to provide a power transmission unit in which the bearing pressure of fitting portions can easily be adjusted.

A fourth object of the present invention is to provide a power transmission unit which ensures the connection of clutches to improve the stability in driving.

A fifth object of the present invention is to provide a power transmission unit which ensures the connection and release of input and output sides to improve the stability in driving.

A sixth object of the present invention is to provide a power transmission unit which can improve the durability of the unit.

The other object of the present invention is to provide a power transmission unit in which the input and output side are always connected to each other at need.

In order to accomplish the objects and advantages mentioned in the above, the present invention provides a power transmission unit comprising an input member for receiving a torque input, a first and a second output members supported in a freely rotatable manner by the input member, and a first and a second clutches provided between the input member and the first and second output members respectively, the clutches connecting the input member and the first and second output members when the angular speed of the input member becomes faster than those of the first and second output members and releasing the connection when the speed becomes slower than those of the first and second output members.

BRIEF DESCRIPTION OF THE DRAWINGS

These and other objects, features and advantages of the present invention will become apparent from the following descriptions of preferred embodiments taken in conjunction with the accompanying drawings in which:

FIG. 11 is a cross sectional view showing the third embodiment of the present invention;

FIG. 23 is a cross sectional view showing the eighth embodiment of the present invention;

FIG. 25 is a cross sectional view showing the ninth embodiment of the present invention;

DETAILED DESCRIPTION OF THE EMBODIMENT

Figure 1:
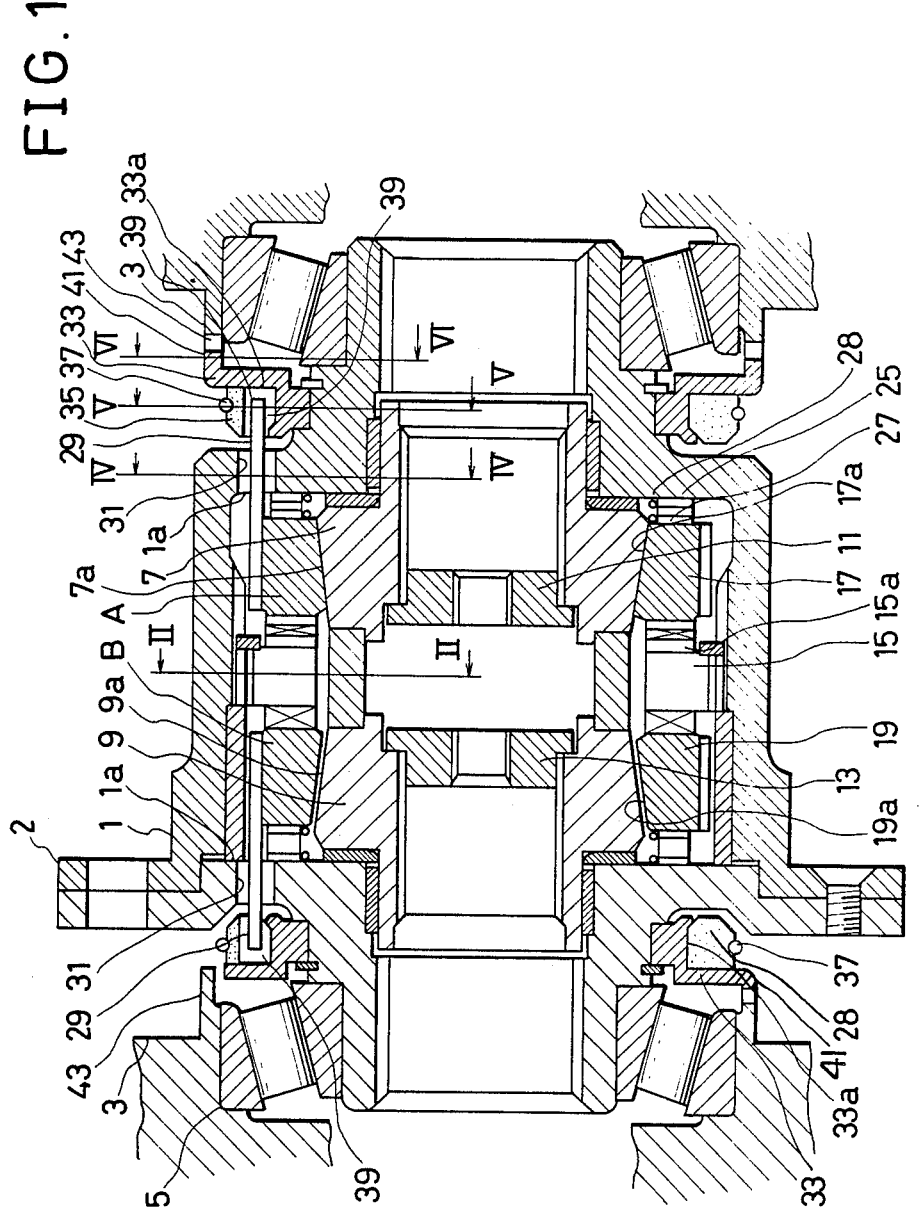
FIG. 1 is a cross sectional view of a power transmission unit showing the first embodiment of the present invention.

Referring now to FIGS. 1 to 8, there is arranged a power transmission unit according to the present invention between rear wheel axles of an FF part-time 4-wheel drive vehicle. A casing 1 as an input member for receiving a torque input is provided in a freely rotatable manner to a housing 3 on the vehicle body side through bearings. A flange 2 of the casing 1 is provided with a ring gear (not shown) which is meshed with a drive pinion connected to a propeller shaft (not shown).

At the rotation center of the casing 1, a first and a second output members 7 and 9 are supported in a freely rotatable manner. Nuts 11 and 13 are provided in a freely rotatable manner on the inner sides of the first and second output members 7 and 9 respectively. The nuts 11 and 13 are screwed into right and left rear wheel axles (not shown) respectively. The axles are connected by means of splines to the first and second output members 7 and 9 respectively. Therefore, the left and right axles are constituted in one with the first and second output members respectively. Between the first and second output members 7 and 9 and the casing 1, a first and a second clutches A and B are provided respectively. In detail, the periphery of the first output member 7 (the second output member 9) is provided with a tapered face 7a (9a) which reduces its diameter toward the center of the casing 1.

Figure 2:
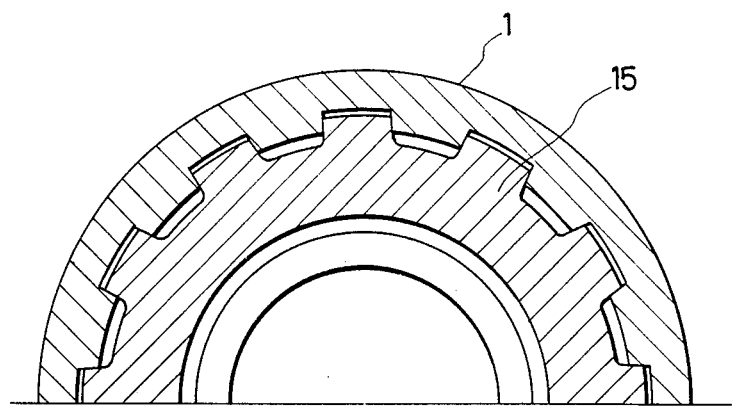
FIG. 2 is a cross sectional view taken along the line II—II shown in FIG. 1.
Figure 3:
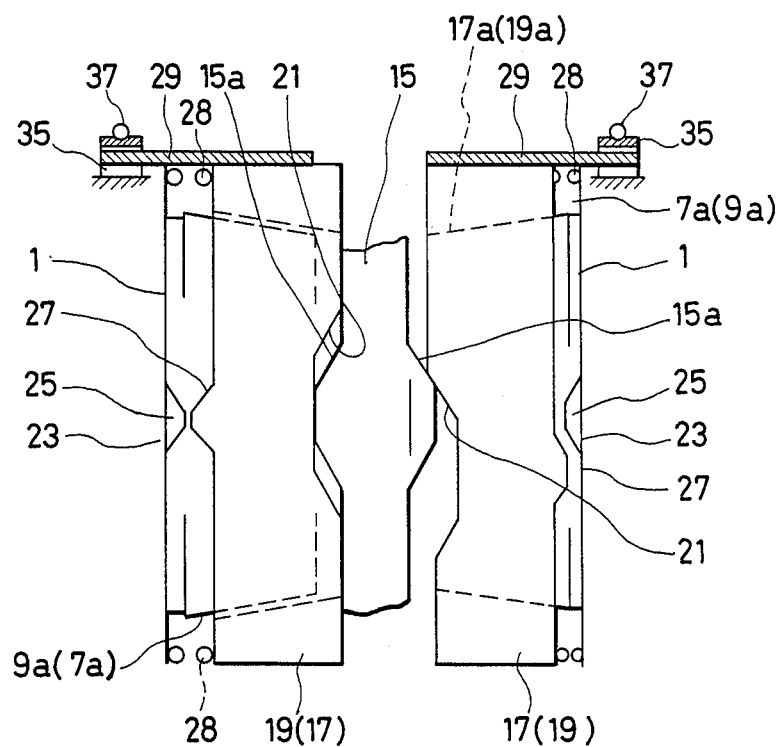
FIG. 3 is a detailed cross sectional view showing the cam engaging portion of a cone clutch member and a cam member.
Figure 4:
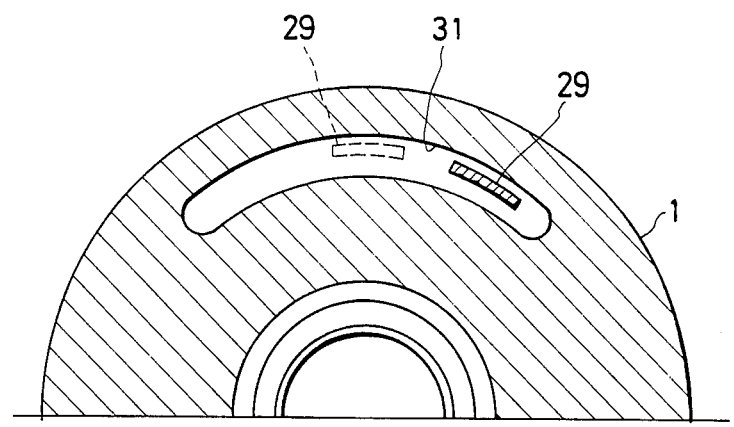
FIG. 4 is a cross sectional view taken along the line IV—IV shown in FIG. 1.

In the middle of the casing 1 on internal face thereof, there is engaged an annular cam member 15 by means of splines to constitute a cam means as shown in FIG. 2. On the left and right sides of the cam member 15, cam faces 15a having angle like shapes are formed as shown in FIG. 3. The periphery of the first output member 7 (the second output member 9), i.e., the tapered face 7a (9a), engages with a first cone clutch member 17 (a second cone clutch member 19) which is freely rotatable. The internal face of the first cone clutch member 17 (the second clutch member 19) is formed to have a tapered face 17a (19a) which has substantially the same taper as the tapered face 7a (9a) of the first output member 7 (the second output member 9) and decreases its diameter toward the center of the casing 1. The first cone clutch member 17 (the second cone clutch member 19) can move in a thrusting direction with respect to the tapered face 7a (9a) of the first output member 7 (the second output member 9). The inner end face of the first cone clutch member 17 (the second cone clutch member 19) has a recessed follower face 21 which is formed to engage with the cam face 15a of the cam member 15. Between the outer end face of the first cone clutch member 17 (the second cone clutch member 19) and the inner face 1a of the casing 1 which faces to said outer end face of the first cone clutch member 17 (the second cone clutch member 19), a cam mechanism 23 is provided to release the clutch. The cam mechanism 23 comprises, as shown in FIG. 3, a cam 25 formed on the inner face 1a, and a follower cam 27 of the first cone clutch member 17 (the second clutch member 19). The cam 25 faces to the cam member 15, and the follower cam 27 is so arranged to correspond to the location of the recessed follower face 21. The numeral 28 represents return springs. To the peripheral end face of the cone clutch member 17 (19), arm bars 29 are fixed to constitute brake means with brake shoes 35. As shown in FIGS. 1 and 4, the ends of the arm bars 29 pass through arcuate long holes 31 provided to the side walls 1a of the casing 1, and project in right and left directions respectively.

Figure 5:
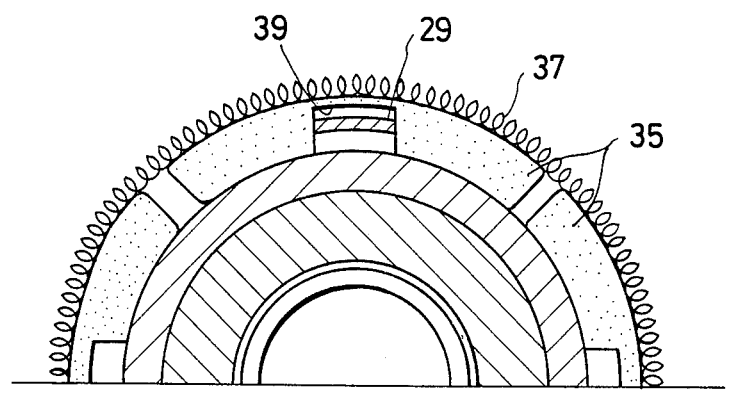
FIG. 5 is a cross sectional view taken along the line V—V shown in FIG. 1.

The both ends of the casing 1 engage at peripheral faces thereof with brake holding frames 33 which are freely rotatable relative to the casing 1. The stepped peripheral engaging face 33a of each brake holding frame 33 receives the brake shoes 35 which are freely slidable with respect to the engaging face 33a as shown in FIG. 5. An annular spring 37 engages with the peripheries of the brake shoes 35 to press the brake shoes 35 against each engaging face 33a. A fastening recess 39 is provided on the inner face of each brake shoe 35 to fasten the end of each arm bar 29.

Figure 6:
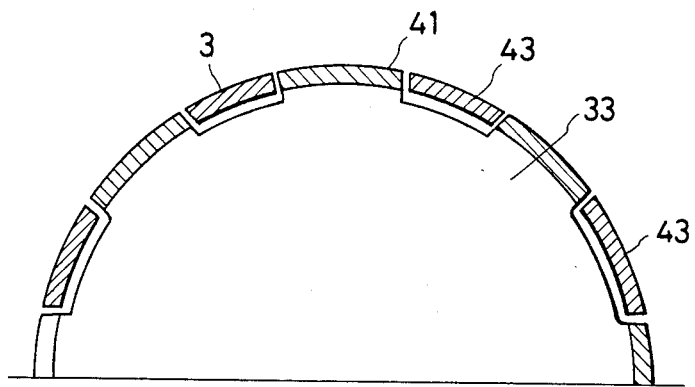
FIG. 6 is a cross sectional view taken along the line VI—VI shown in FIG. 1.

The base end face of each brake holding frame 33 is provided with a plurality of engaging projections 41 formed with equal intervals in a circumferential direction as shown in FIG. 6. The end face of the housing 3 is provided with a plurality of receiving portions 43 corresponding to the engaging projections 41. The engaging projections 41 removably engage with the receiving portions 43 to hold the brake holding frame 33 to the housing 3 without revolving.

The operation of the embodiment of the present invention which has the constitution mentioned in the above will be explained hereunder.

In the 4-wheel driving mode, the casing 1 receives a torque input through the ring gear (not shown). According to the rotation of the casing 1, the cam member 15 which is engaged with the casing 1 through splines rotates together with the casing 1. According to the rotation of the cam member 15, the first and the second cone clutch members 17 and 19 which are connected to the cam member 15 through the cam mechanism tend to rotate. However, the brake shoes 35 connected to the arm bars 29 receive friction resistance from the engaging faces 33a of the brake holding frames 33, and the casing 1 and the first and second cone clutch members 17 and 19 rotate relative to each other so that each arm bar 29 comes to a position indicated by a full line from a position indicated by a dotted line shown in FIG. 4. According to the relative rotation, the cam face 15a and the recessed follower face 21 become a state shown on the right side of FIG. 3 so that the recessed follower face 21 climbs on the cam face 15a, and the first cone clutch member 17 (the second cone clutch member 19) moves toward an outside direction. As a result, the tapered face 17a (19a) of the first cone clutch member 17 (the second cone clutch member 19) is pressed against the tapered face 7a (9a) of the first output member 7 (the second output member 9) as shown on the right half of FIG. 1. Accordingly, the torque input of the casing 1 is transmitted to the right and left axles (not shown) through the right and left clutches A and B, and the first and second output members 7 and 9.

Figure 7:
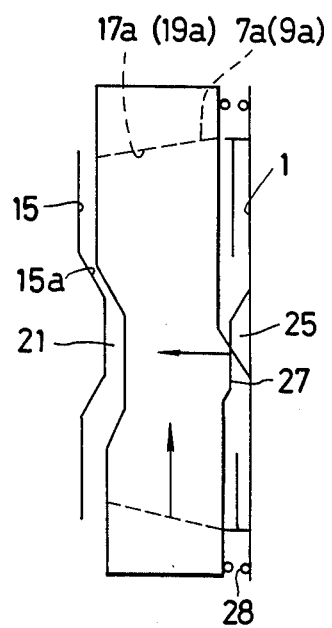
FIGS. 7 and 8 are views showing the operation of the unit.
Figure 8:
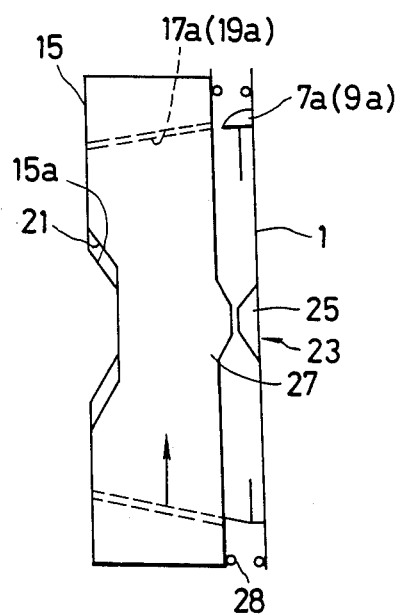

In cornering run in the 4-wheel driving mode, a difference is caused between the angular speeds of the inner and outer wheels. Since the angular speed of, for instance, the first output member 7 on the inner wheel side is smaller than that of the casing 1, the driving force from the casing 1 is successively transmitted to the wheel axle on the inner wheel side through the first cone clutch member 17 which maintains the function mentioned above. On the other hand, the angular speed of the second output member 9 on the outer wheel side becomes larger than that of the casing 1 so that the second cone clutch member 19 shown in FIG. 3 turns in a reverse direction relative to the cam member 15. According to the relative movement of the casing 1 and the second cone clutch member 19, the cam mechanism 23 for releasing the clutch is activated to press the second cone clutch member 19 against the cam member 15 as shown in FIGS. 7 and 8. Due to the pressing, the clutch is securely released even if the tapered face 9a is fitted to the tapered face 19a. The recessed follower face 21 completely receives the cam face 15a with the help of the return spring 28. As a result, a gap is caused between the tapered face 19a of the second cone clutch member 19 and the tapered face 9a of the second output member 9 as shown on the left half of FIG. 1 so that the rear wheel axle on the left side rotates freely. The angular speed difference of the rear wheels is thus absorbed to realize a smooth cornering drive.

If one of rear wheels, for instance a rear wheel on the left side, goes into muddy soil to slip in the 4-wheel driving mode, the other rear wheel on the right side receives resistance from a road surface so that the angular speed of the first output member 7 does not become larger than that of the casing 1, and the connection of the corresponding clutch A is maintained. Thus, the vehicle may easily be driven even on such a bad road.

If the 4-wheel drive mode is changed to a 2-wheel drive mode, the power connection between an engine and a rear drive shaft is disconnected by a known shifting apparatus to stop the torque input for the casing 1. On the other hand, the both rear wheels receive driving force from a road surface to rotate the first and second output members 7 and 9. Therefore, the shifting from 4-wheel to 2-wheel mode causes that the angular speeds of the first and second output members 7 and 9 become larger than that (finally becoming zero) of the casing 1. As mentioned above, the relation between the cam member 15 and the first and second clutch members 17 and 19 becomes the one shown on the left side of FIG. 3 to disconnect both the clutches A and B. The first and second output members 7 and 9 up to the left and right rear wheels thus idle to reduce the driving resistance.

In this case, the cam mechanisms 23 for releasing clutches ensure to release the tapered faces 7a and 9a from the tapered faces 17a and 19a respectively to improve the stability in driving because unbalance of the left and right rear wheels in idling is not caused.

The present invention is applicable not only for the part-time 4-wheel drive vehicle but also for a full-time 4-wheel drive vehicle, etc., in which wheels automatically idle in a speed reducing operation so that the holding energy of the vehicle is prevented from reducing, thereby improving the rate of fuel consumption.

As is apparent from the above description, the embodiment of the present invention can realize the function of a differential limit type differential unit as well as the function of a hub clutch which is automatically connected and disconnected. If the embodiment is applied for a part-time 4-wheel drive vehicle, a hub clutch can be omitted, and, if it is applied for a full-time 4-wheel drive vehicle, the rate of fuel consumption can be improved.

Further, the connections on the input and output sides can be reliably released by means of cam mechanisms so that unbalance in left and right wheels may not be caused. Thus, driving stability can be improved.

In addition, a first and a second cam means for activating a first and a second clutches are formed on a casing and a first and a second cone clutch members according to the embodiment of the present invention so that a conventional cam shaft may be omitted, and load concentration on the casing which will have to support the conventional cam shaft may be reduced.

Figure 9:
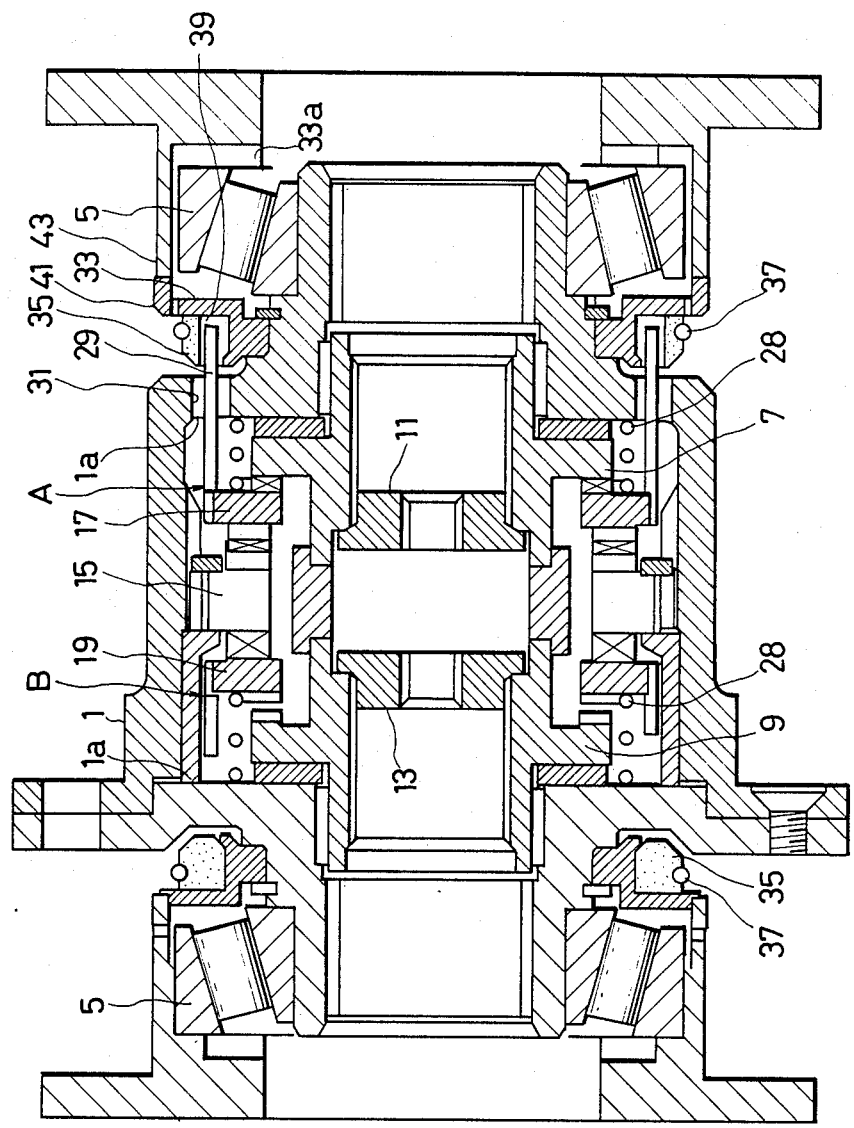
FIG. 9 is a cross sectional view in connection with the second embodiment of the present invention.
Figure 10:
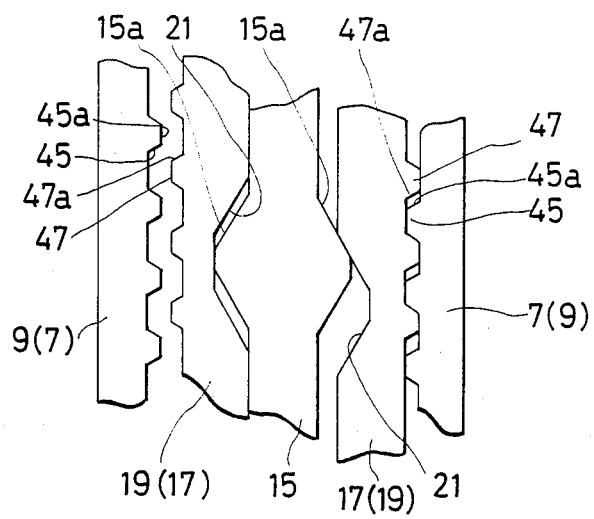
FIG. 10 is a detailed cross sectional view showing the cam engaging portion of the second embodiment.

Referring to FIGS. 9 and 10, a power transmission unit according to the second embodiment of the present invention will be shown.

In this embodiment, dog clutches are used as clutches A and B. A first dog clutch member 17 (a second dog clutch member 19) meshes with the first output member 7 (the second output member 9) through teeth. This meshing method is surer in transmitting drive force to left and right wheels than the friction meshing of cone clutch members so that the stability in driving is further improved. Each of teeth 45 (47) of the dog clutch has a slanted face 45a (47a) to act in place a cam mechanism for releasing the clutch. Since other constitution and operation of the second embodiment are substantially the same as those of the first embodiment, explanation thereof will be omitted. Like numerals and marks represent like parts in the first and second embodiments.

Figure 12:
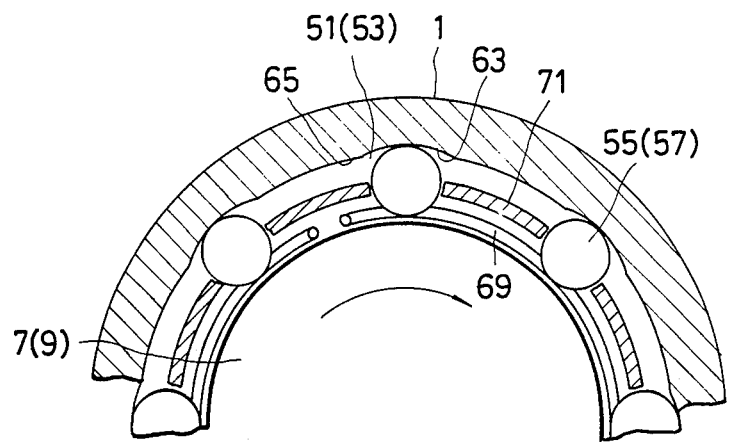
FIG. 12 is a cross sectional view taken along the line XII—XII shown in FIG. 11.
Figure 13:
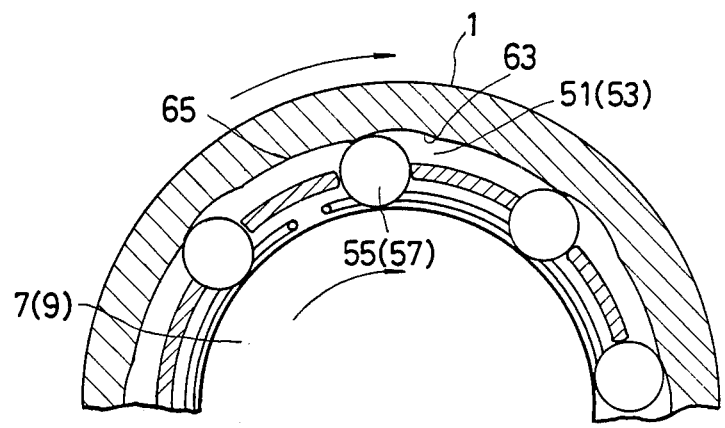
FIG. 13 is a cross sectional view taken along the line XIII—XIII shown in FIG. 11.

Referring to FIGS. 11 to 13, a power transmission unit according to the third embodiment of the present invention will be shown.

In this embodiment, like parts used in the first embodiment are represented by like numerals and marks, and the detailed explanation of the third embodiment will be omitted.

A guiding gap portion 51 (53) is formed between the input member 1 and the first output member 7 (the second output member 9). A first connecting member 55 (a second connecting member 57) is inserted in the first guiding gap portion 51 (the second guiding gap portion 53). The first connecting member 55 (the second connecting member 57) moves back and forth in the first guiding gap portion 51 (the second guiding gap portion 53) in the rotational direction of the input member 1 so that the connecting member is meshed between the input member 1 and the first output member 7 (the second output member 9) to connect them together. A first resistance means 59 (a second resistance means 61) enables the first connecting member 55 (the second connecting member 57) to move back and forth in the rotational direction of the input member 1 with resistance applied by the resistance means.

Namely, the first guiding gap portion 51 (the second guiding gap portion 53) is formed between the casing 1, which acts as an input member, and the first output member 7 (the second output member 9). The first guiding gap portion 51 (the second guiding gap portion 53) is so constituted to have recessed portions 63 formed with predetermined intervals on the internal circumference of the casing 1. The recessed portions 63 are formed on one side of the casing 1 over the first and second guiding gap portions 51 and 53. The recessed portions 63 and the internal surface of the casing 1 join through r's 65. Between each recessed portion 63 and the first output member 7, i.e., in the first guiding gap portion 51, a first roller like connecting member 55 is movably engaged. Similarly, a second connecting member 57 is movably engaged in the second guiding gap portion 53. The central portion in an axial direction of the first connecting member 55 (the second connecting member 57) is formed with a groove 67. A snap ring like spring 69 is received in the groove 67. The first connecting member 55 (the second connecting member 57), therefore, is pushed away from the first output member 7 (the second output member 9). A ring 71 engages with the first connecting member 55 (the second connecting member 57), said ring 71 being provided with arm bars 29 projecting therefrom. The numeral 73 represents a collar.

The first and the second resistance means have the same constitutions as those of the first embodiment, namely, comprising arm bars 29, long holes 31, brake holding frames 33, stepped periphery fitting faces 33a, brake shoes 35, and annular springs 37 respectively.

Based on the constitution mentioned in the above, the operation of the power transmission unit according to the embodiment will be described.

According to the rotation of the casing 1, the first and the second connecting members 55 and 57 rotates relative to the casing 1 so that the brake shoes 35 connected to the arm bars 29 receive friction resistance from the engaging faces 33a of the brake holding frames 33 to bring each arm bar 29 to a position indicated by a full line from a position indicated by a dotted line shown in FIG. 4. Accordingly, the first connecting member 55 (the second connecting member 57) moves in the first guiding gap portion 51 (the second guiding gap portion 53) in the rotating direction, and is engaged between the casing 1 and the first output member 7 (the second output member 9) to connect them together as shown on the left half of FIG. 11, and in FIG. 13). Accordingly, the torque input of the casing 1 is transmitted to the right and left axles (not shown) through the first and second connecting members 55 and 57 and the first and second output members 7 and 9. At this moment, the engaging force of the first and second connecting members 55 and 57 is applied in a radial direction so that the force less affects as abnormal force on bearings 5, etc.

The first and second connecting members 55 and 57 of the above embodiment may be constituted to have ball like shapes. The first and the second resistance means may be of fluid types. The clutches A and B may be arranged either between front wheel axles or between rear wheel axles.

As is apparent from the above description, the third embodiment, in addition to the functions of the first embodiment, has a function that abnormal force which will act on a member for supporting the input member is reduced to improve the durability of the unit.

Figure 15:
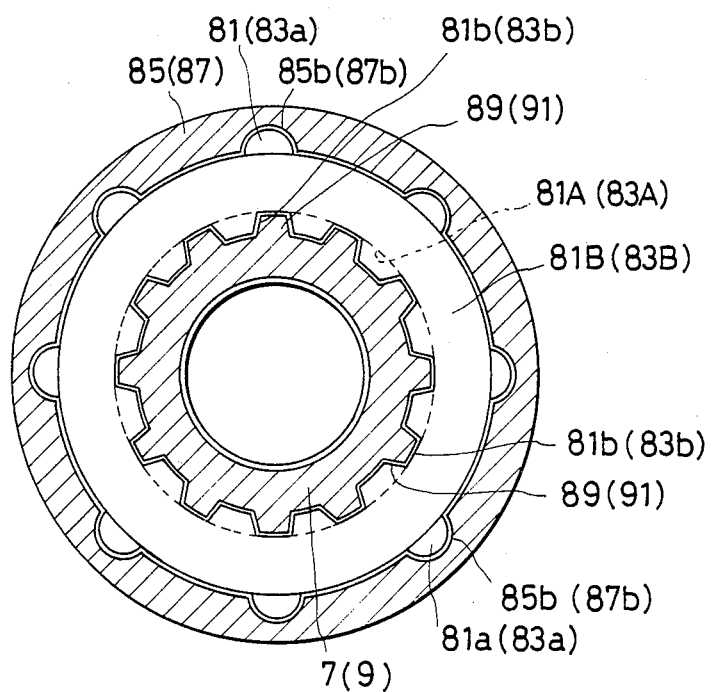
FIG. 15 is a cross sectional view taken along the line XV—XV shown in FIG. 14.
Figure 14:
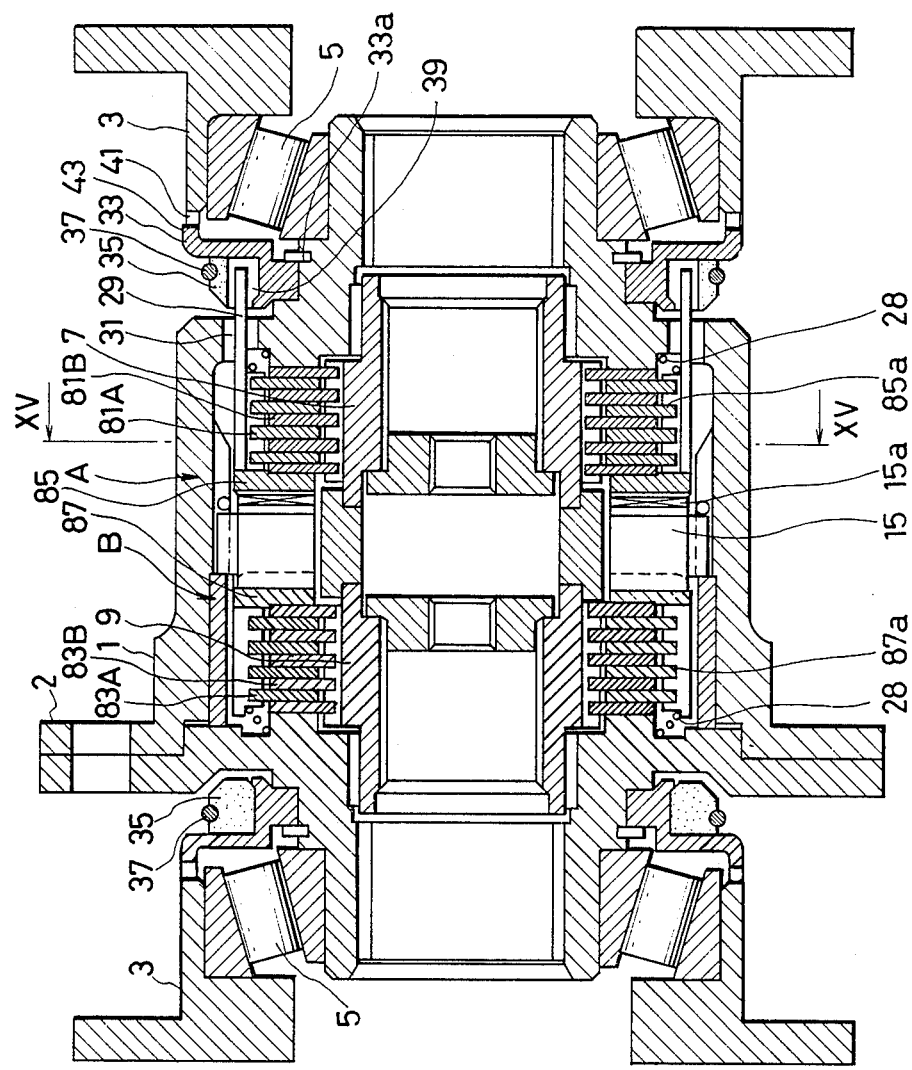
FIG. 14 is a cross sectional view showing the fourth embodiment of the present invention.
Figure 16:
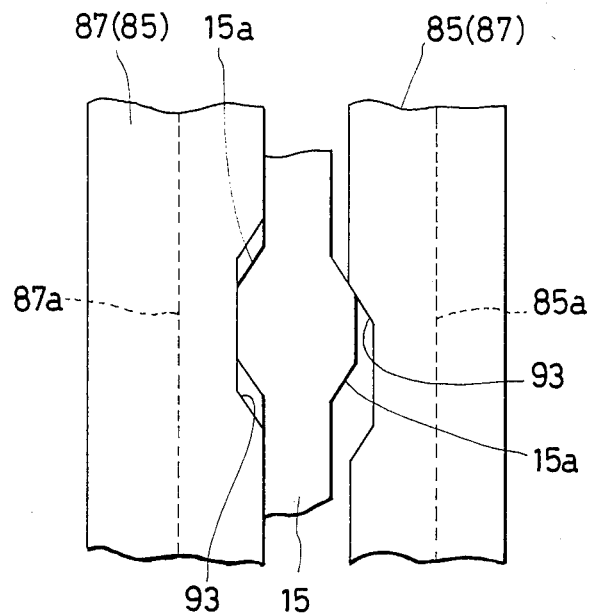
FIG. 16 is a detailed cross sectional view showing the cam engaging portions of multiple disc clutches and a cam member.

Referring to FIGS. 14 to 16, the fourth embodiment according to the present invention will be shown.

In this embodiment, like parts used in the first embodiment are represented by like numerals and marks, and the detailed explantation will be omitted.

The embodiment comprises a first clutch A and a second clutch B constituted as mentioned below. A first multiple disc clutch member 81 (a second multiple disc clutch member 83) is formed between the input member 1 and the first output member 7 (the second output member 9). A first driving member 85 (a second driving member 87) causes the connection of the first multiple disc clutch member 81 (the second multiple disc clutch member 83) when the angular speed of the input member 1 exceeds that of the first output member 7 (the second output member 9), and release the connection of the first multiple disc clutch 81 (the second multiple disc clutch 83) when the speed becomes slower than that of the first output member 7 (the second output member 9).

Namely, the first clutch A (the second clutch B) is provided between the casing 1 acting as the input member and the first output member 7 (the second output member 9). The first clutch A (the second clutch B) has the first driving member 85 (the second driving member 87), and the first multiple disc clutch member 81 (the second multiple clutch member 83) provided with first outer discs 81A (second outer discs 83A) and first inner discs 81B (second inner discs 83B). The internal circumferential face of the first driving member 85 (the second driving member 87) is formed with a plurality of receiving portions 85b (87b) with equal circumferential intervals in an axial direction. Each of the first outer discs 81A (the second outer discs 83A) of the first multiple disc clutch member 81 (the second multiple disc clutch member 83) is formed in an annular shape. As shown in FIG. 15, the peripheral face of each of the first outer disc 81A (the second outer disc 83A) is provided with projections 81a (83a) corresponding to the receiving portions 85b (87b) of the first driving member 85 (the second driving member 87). The projections 81a (83a) engage with the receiving portions 85b (87b) in a freely slidable manner. The first outer discs 81A (the second outer discs 83A) are supported movably in an axial direction by the first driving member 85 (the second driving member 87). The first inner discs 81B (the second inner discs 83B) are formed in annular shapes and arranged in between the first outer discs 81A (the second outer discs 83A). As shown in FIG. 15, the inner circumferential face of each of the first inner discs 81B (the second inner discs 83B) is provided with receiving portions 81b (83b) corresponding to the projections 89 (91) of the first output member 7 (the second output member 9). The receiving portions 81b (83b) engage slidably with the projections 89 (91). The first inner discs 81B (the second inner discs 83B) are held movably in an axial direction by the first output member 7 (the second output member 9).

The cam member 15 is engaged in the center of the casing 1 along internal face thereof by means of splines. On both sides of the cam member 15, cam faces 15a having angle shapes are formed as shown in FIG. 16. Each cam face 15a engages with each recessed follower face 93 formed on the inner end face of the first driving member 85 (the second driving member 87) for the first multiple disc clutch member 81 (the second multiple clutch member 83). Between the outer end face of the first driving member 85 (the second driving member 87) and the inner end face 1a of the casing 1 which faces to the outer end face of the first driving member 85 (the second driving member 87), a return spring 28 is arranged. On the outer face of the first driving member 85 (the second driving member 87), arm bars 29 which constitute brake means together with brake shoes 35 are fixed.

Based on the above constitution, the operation of the power transmission unit according to the embodiment will be described.

According to the rotation of the casing 1 which receives a torque input, the cam member 15 rotates. The rotation of the cam member 15 tends to cause the rotation of the first and second multiple disc clutch members 81 and 83. However, the first and second multiple disc clutch members 81 and 83 rotate relative to the casing 1 so that the arm bars 29 moves from a position indicated by a dotted line in FIG. 4 to a position indicated by a continuous line. Due to the relative rotation, the recessed follower face 93 climbs on the cam face 15a, and the first driving member 85 (the second driving member 87) for the first multiple disc clutch member 81 (the second multiple disc clutch member 83) moves toward outer side. As a result, the first outer discs 81A (the second outer discs 83A) are pressed against the first inner discs 81B (the second inner discs 83B) as shown on the right half of FIG. 14. The torque input of the casing 1 is thus transmitted to the right and left axles (not shown) through the first and second clutches A and B and the first and second output members 7 and 9.

The operations in the cases that an angular speed difference is caused between inner and outer wheels, that one of left and right wheels is caused to idle, and that the driving mode is changed from 4-wheel drive to 2-wheel drive are substantially the same as those of the first embodiment. Therefore, explanations will be omitted for those cases in this embodiment.

In addition to the functions of the first embodiment, the fourth embodiment realizes a function that the bearing pressure of the first and second multiple disc clutches can easily be adjusted by selecting the number of discs of the clutches.

Figure 18:
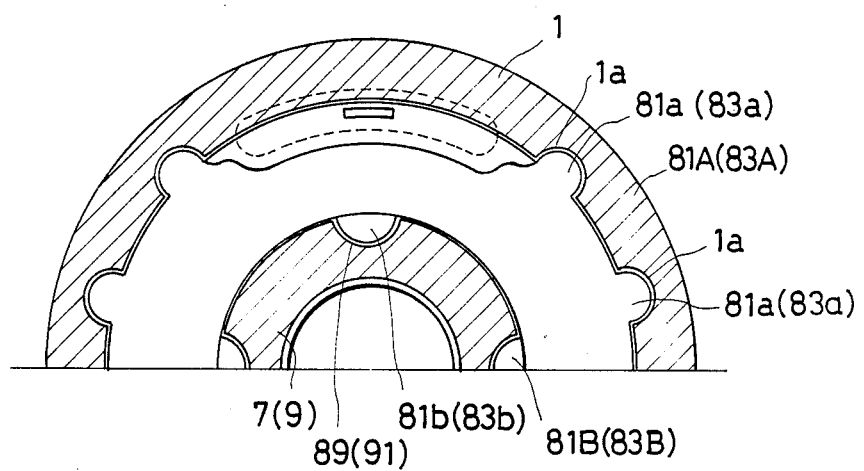
FIG. 18 is a cross sectional view taken along the line XIX—XIX shown in FIG. 17.
Figure 17:
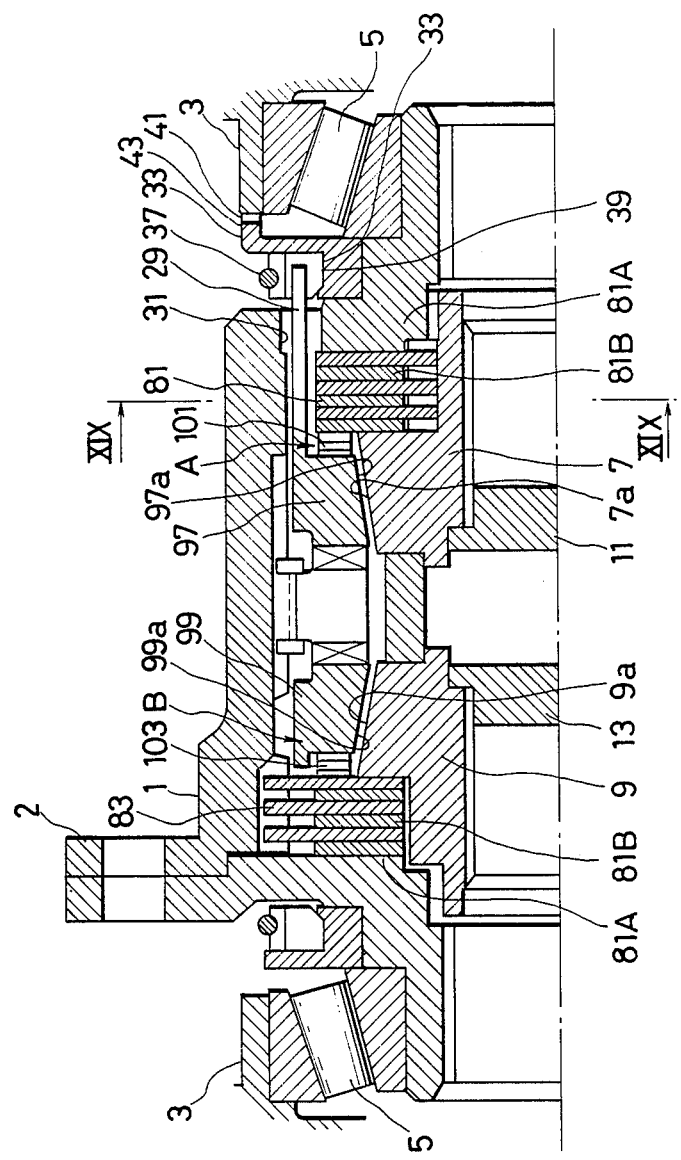
FIG. 17 is a cross sectional view showing the fifth embodiment of the present invention.

Referring to FIGS. 17 and 18, the fifth embodiment according to the present invention is shown.

In this embodiment, like parts used in the first and fourth embodiments are represented by like numerals and marks, and the detailed explanation will be omitted.

The fifth embodiment is constituted based on the fourth embodiment, wherein the first output member 7 (the second output member 9) is able to engage by friction force with the first driving member 85 (the second driving member 87) at a time when the first driving member 85 (the second driving member 87) moves.

A first cone clutch member 97 (a second cone clutch member 99) corresponding to the first driving member 85 (the second driving member 87) of the fourth embodiment engages in a freely rotatable manner with the tapered face 7a (9a) formed on the first output member 7 (the second output member 9). The internal face of the first cone clutch member 97 (the second cone clutch member 99) comprises a tapered face which taper is substantially the same as that of the tapered face 7a (9a) of the first output member 7 (the second output member 9). In other words, the internal face of the first cone clutch member 97 (the second cone clutch member 99) is provided with a tapered face 97a (99a) which reduces its diameter toward the center of the casing 1, and movable in a thrusting direction with respect to the corresponding tapered face 7a (9a) of the first output member 7 (the second output member 9). The tapered face 7a (9a) constitutes the first clutch A (the second clutch B) together with the first cone clutch member 97 (the second cone clutch member 99). The inner end face of the first cone clutch member 97 (the second cone clutch member 99) is provided with a recessed follower face 93 which engages with the cam face 15a of the cam member 15 as shown in FIG. 16. The first multiple disc clutch member 81 (the second multiple disc clutch member 83) is arranged between the inner end face of the casing 1 and both the outer end face of the first cone clutch member 97 (the second cone clutch member 99) and the outer end face of the first output member 7 (the second output member 9), both the outer end faces facing to said inner end face of the casing 1. A plate spring 101 (103) is arranged between the first multiple disc clutch member 81 (the second multiple clutch member 83) and the first cone clutch member 97 (the second cone clutch member 99).

Based on the constitution mentioned above, the operation of the power transmission unit according to the fifth embodiment will be described.

In a 4-wheel drive mode, the cam member 15 receives a torque input from the casing 1 to rotate the first and second cone clutch members 97 and 99. However, the brake shoes 35 connected to the arm bars 29 receive friction resistance from the fitting face 33a of the brake holding frame 33 to move the arm bars 29 from a position indicated by a dotted line shown in FIG. 4 to a position indicated by a continuous line, and, according to the movement, the first and second cone clutch members 97 and 99 rotate relative to the casing 1. The relative rotation causes to put the cam face 15a and the recessed follower face 93 in a state shown on the right side of FIG. 16, in which the the recessed follower face 93 climbs on the cam face 15a to move the first cone clutch member 97 (the second cone clutch member 99) toward outer side. According to the movement of the first cone clutch member 97 (the second cone clutch member 99), the first multiple disc clutch member 81 (the second multiple disc clutch member 83) is applied with pressure through the plate spring 101 (103). At the same time, the tapered face 97a (99a) of the first cone clutch member 97 (the second cone clutch member 99) is pressed against the tapered face 7a (9a) of the first output member 7 (the second output member 9) as shown in the right half of FIG. 17. Further, the first outer discs 81A (the second outer discs 83A) and the first inner discs 81B (the second inner discs 83B) of the first multiple disc clutch member 81 (the second multiple disc clutch member 83) are pressed against each other to transmit the torque input of the casing 1 to the right and left axles (not shown) through the first and second clutches A and B and the first and second output members 7 and 9. In this case, the torque to be transmitted from the casing 1 to the first and second output members 7 and 9 is divided into the first and second cone clutch members 97 and 99 and the first and second multiple disc clutch members 81 and 83. The first cone clutch member 97 (the second cone clutch member 99) which pushes the first multiple disc clutch member 81 (the second multiple disc clutch member 83) can be used for enforcing the fitting force of the first multiple disc clutch member 81 (the second multiple disc clutch member 83). Further, the clutches are slowly fitted at first due to the actions of the plate springs 101 and 103 so that the fitting is performed with less impact.

The operations in the cases that an angular speed difference is caused between inner and outer wheels, that one of left and right wheels is caused to idle, and that the driving mode is changed from 4-wheel drive to 2-wheel drive are substantially the same as those of the first embodiment. Therefore, explanations will be omitted for those cases in this embodiment.

Figure 19:
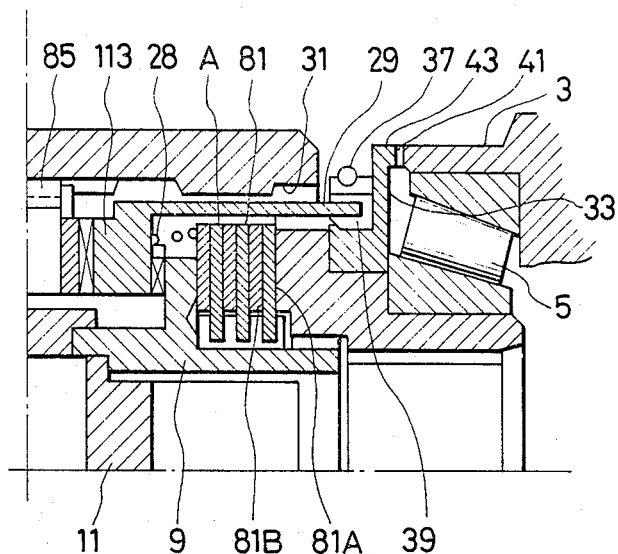
FIG. 19 is a cross sectional view showing the sixth embodiment of the present invention.

Referring to FIG. 19, a power transmission unit according to the sixth embodiment of the present invention is shown.

In this embodiment, like parts used in the first and fourth embodiments are represented by like numerals and marks, and the detailed explanation will be omitted.

In this embodiment, the first and second cone clutch members 97 and 99 of the first and second clutches A and B in the fifth embodiment are replaced with a first and a second dog clutches 111 and 113. The first and second dog clutches 111 and 113 engage with the first and second output members 7 and 9 respectively through nails. Power is transmitted to the right and left wheels in this embodiment surer than the friction engaging technique using cone clutch members so that the stability in driving any further be improved. Similar to the second embodiment, in this embodiment using dog clutches, slanted faces 45a and 47a are formed on nails 45 and 47 respectively which constitute clutch portions. The slanted faces 45a and 47a constitute cam mechanisms for releasing clutches.

In addition to the functions of the first embodiment, the sixth embodiment can improve the certainty of the clutch connection.

Figure 21:
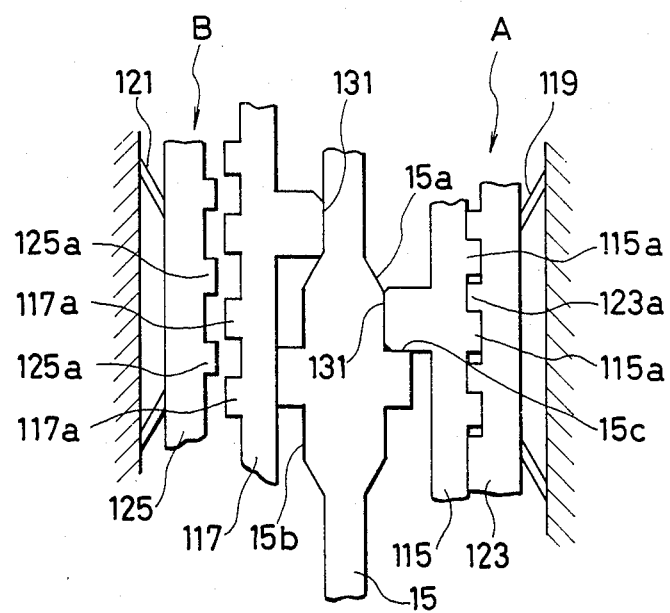
FIG. 21 is a detailed cross sectional view showing the engaging portions of dog clutches and a cam member according to the seventh embodiment.
Figure 20:
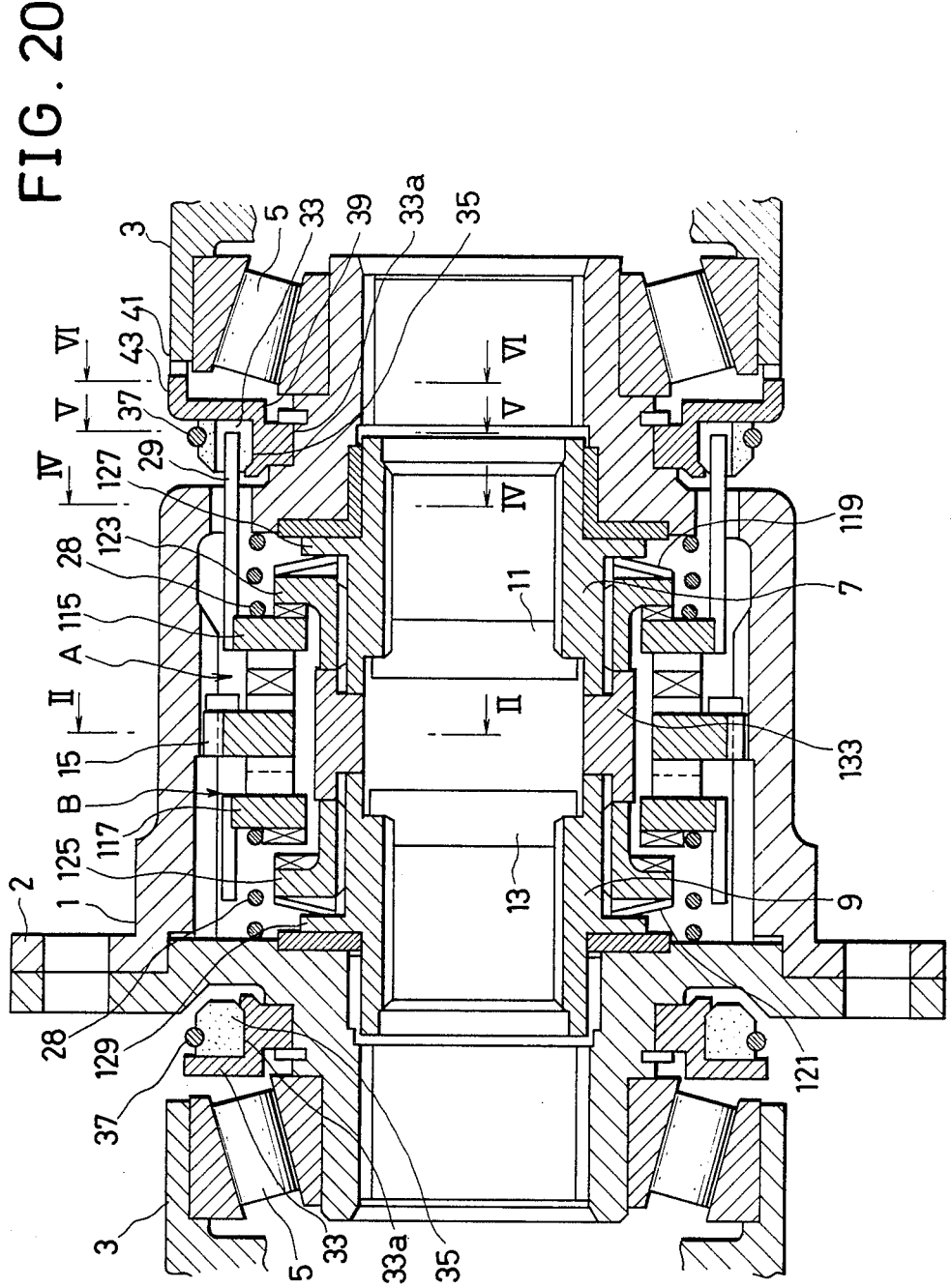
FIG. 20 is a cross sectional view showing the seventh embodiment of the present invention.
Figure 22:
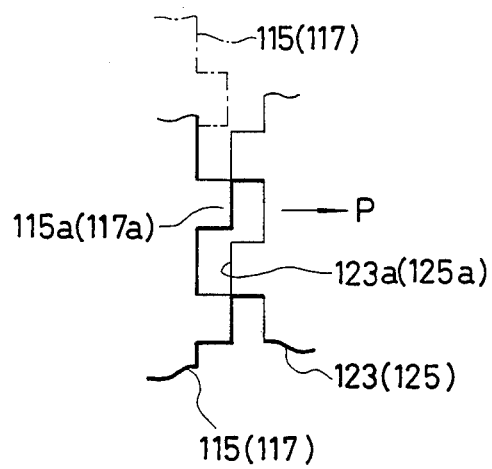
FIG. 22 is a view showing the operation of the seventh embodiment.

Referring to FIGS. 20 to 22, a power transmission unit according to the seventh embodiment of the present invention is shown.

In this embodiment, the first clutch A (the second clutch B) comprises a first dog clutch member 115 (a second dog clutch member 117) and a first resilient member 119 (a second resilient member 121) which supports resiliently, in a back and forth direction in the fitting movement, at least one group of fitting nails 115a (117a) of the first dog clutch member 115 (the second dog clutch member 117) and stopping nails 123a (125a).

Namely, the first clutch A (the second clutch B) has the first dog clutch member 115 (the second dog clutch member 117), and, in addition to that, a first follower member 123 (a second follower member 125) connected to the first output member 7 (the second output member 9) by means of splines. Between the outer end face of the first follower member 123 (the second follower member 125) and a flange 127 (129) provided on the periphery of the first output member 7 (the second output member 9), the first resilient member 119 (the second resilient member 121) comprising a plate spring is arranged to support resiliently in a back and forth direction in the fitting movement the first follower member 123 (the second follower member 125) which acts as the stopping nails.

On the cam member 15 side of the first dog clutch member 115 (the second dog clutch member 117), a projected follower face 131 is formed which engages with the cam face 15a of the cam member 15 as shown in FIG. 21. The fitting nails 115a (117a) are formed on the first dog clutch member 115 (the second dog clutch member 117), and the stopping nails 123a (125a) on the first follower member 123 (the second follower member 125), said fitting and stopping nails constituting clutch portions. The projected follower faces 131, the fitting nails 115a and 117a, and the stopping nails 123a and 125a are respectively formed to have the pressure angle of substantially zero. A stopper ring 29 which limits the movement toward inner side of the first follower member 123 (the second follower member 125) is a return spring of the first dog clutch member 115 (the second dog clutch member 117).

The operation of the seventh embodiment will be explained. When the fitting nails 115a (117a) of the first dog clutch member 115 (the second dog clutch member 117) engage with the stopping nails 123a (125a) of the first follower member 123 (the second follower member 125) at chamfers as shown in FIG. 22, the first dog clutch member 115 (the second dog clutch member 117) is moved in a thrusting direction and supported by a vertical face 15b having a pressure angle of substantially zero so that the first dog clutch member 115 (the second dog clutch member 117) receives only rotational force. Due to the rotation of the first dog clutch member 115 (the second dog clutch member 117), the first follower member 123 (the second follower member 125) resists against the first resilient member 119 (the second resilient member 121) and moves in a direction indicated by an arrow P shown in FIG. 22. When the fitting nails 115a (117a) are located in between the stopping nails 123a (125a), the resilient force of the first resilient member 119 (the second resilient member 121) performs smoothly the engagement of the fitting nails 115a (117a) and the stopping nails 123a (125a). Therefore, even if a torque input to the input member 1 changes frequently its magnitude, the engagement of both the nails is not easily broken. Thus, troubles such that driving force is transmitted only to one wheel in driving a vehicle straight will not be caused so that the stability in driving may be increased.

The operations in cases that an angular speed difference is caused between inner and outer wheels, that one of left and right wheels is caused to idle, and that the driving mode is changed from 4-wheel drive to 2-wheel drive are substantially the same as those of the first embodiment. Therefore, explanations will be omitted for those cases in this embodiment.

In addition to the functions realized by the first embodiment, the seventh embodiment provides an advantage to prevent driving force being transmitted only to one wheel in straight driving by virtue of clutches which are securely engaged to improve the stability in driving.

Figure 24:
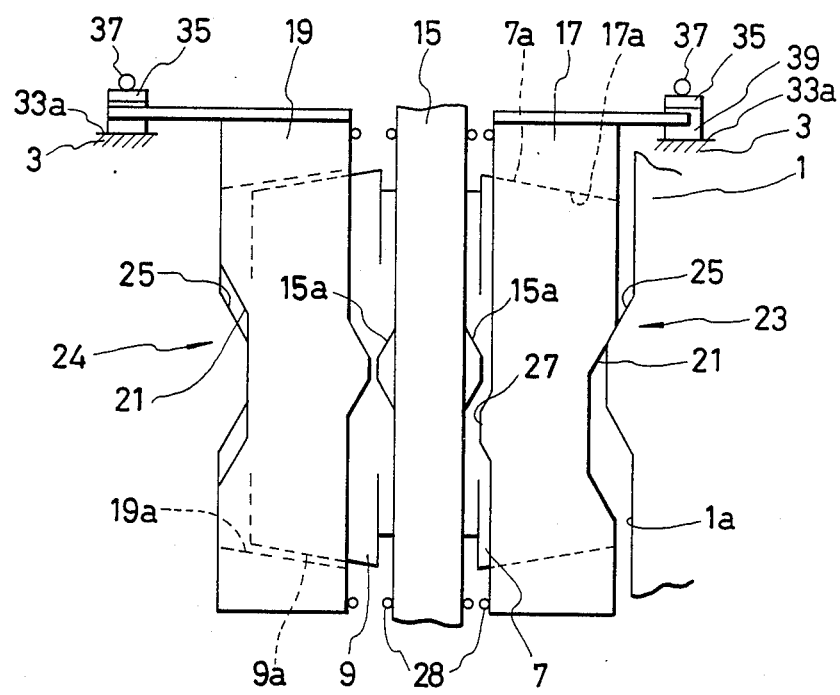
FIG. 24 is a detailed cross sectional view showing the cam engaging portions of cone clutch members and a casing according to the eighth embodiment.
Figure 26:
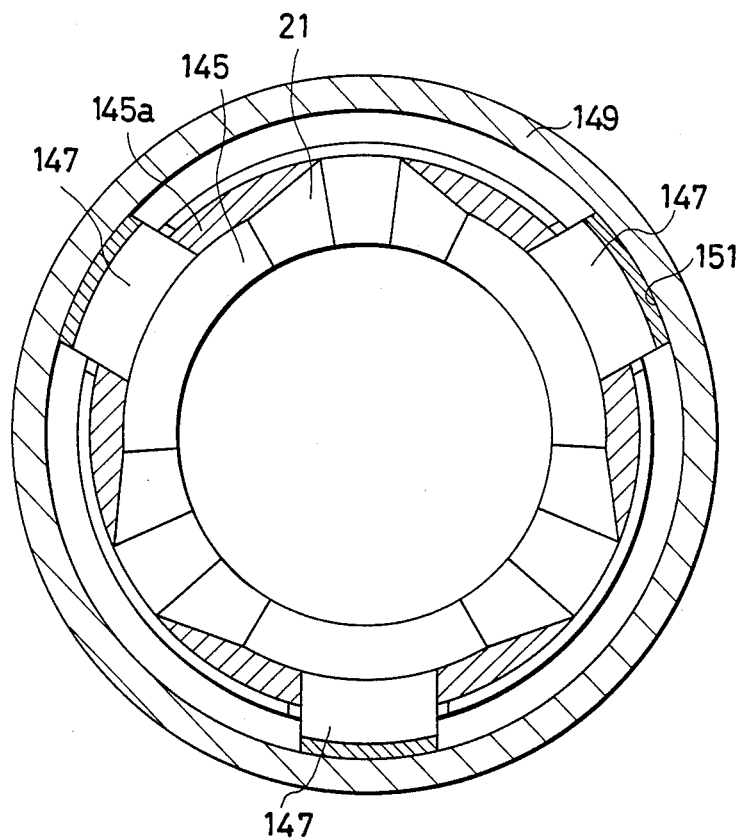
FIG. 26 is a cross sectional view taken along the line IIXVII—IIXVII shown in FIG. 25.

Referring to FIGS. 23 and 24, a power transmission unit according to the eighth embodiment of the present invention will be shown. In this embodiment, the diameters of tapered faces 7a and 9a of the first and second output members 7 and 9, and the diameters of the tapered faces 17a and 19a of the first and second cone clutch members 17 and 19 are sized in reverse to those of the first embodiment. Namely, the diameters of the tapered faces 7a and 9a, and 17a and 19a increase toward the center of the casing 1.

Referring to FIGS. 25 to 28, the ninth embodiment of the present invention will be shown.

In this embodiment, an operating means 141 which enables the first and second clutchs A and B used in the preceding embodiments to be manually connected.

Figure 27:
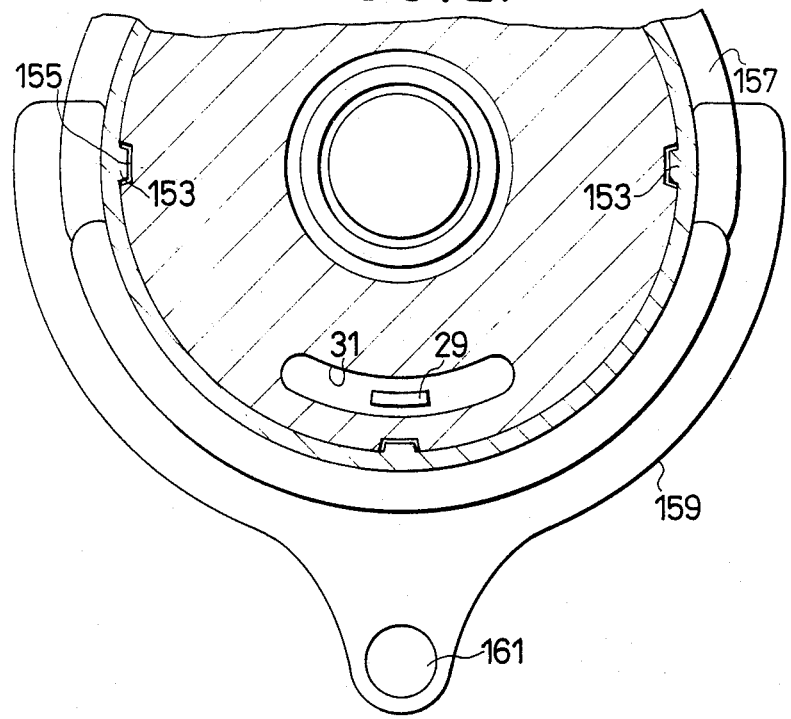
FIG. 27 is a cross sectional view taken along the line IIXVIII—IIXVIII shown in FIG. 25.

Namely, a first dog clutch member 143 (a second dog clutch member 145) constituting the first clutch A (the second clutch B) is provided with nails 143b (145b) which engage with nails 163 (165) of the first output member 7 (the second output member 9). On the periphery of the casing 1, the operating means 141 is provided as shown in FIGS. 25 and 27 to move the first and second dog clutch members 143 and 145 to cause engagement thereof. The operating means 141 has moving members 147 which are movable in the radial direction of the casing 1. The moving members 147 have slanted faces which are formed to face outer side along the axis of the casing 1 respectively. The slanted faces 147a face to slanted faces 143a and 145a respectively which are formed on inner sides of the peripheries of the first and second dog clutch members 143 and 145 respectively. The moving members 147 have slanted faces 147b respectively which are formed outside the casing 1 to slant toward the casing 1. The portions of the moving members 147 located outside the casing 1 are received in recessed portions 151 of a slide ring 149 fitted to the casing 1. The recessed portions 151 have slanted faces 151a which are formed to face the slanted faces 147b of the moving members 147.

The slide ring 149 is so constituted that it is movable along the rotation axis of the casing 1. A projecting portion 153 formed on the inner face of the slide ring 149 is received in a groove 155 formed on the casing 1 along rotation axis thereof. A circumferential groove 157 is formed on the periphery of the slide ring 149. A fork 159 is received in the circumferential groove 157. The fork is also fixed to an operation rod 161 which is constituted to be moved in the direction of the movement of the slide ring 149 according to the operation of an operation lever (not shown).

Based on the constitution mentioned above, the operation of the power transmission unit according to the eighth embodiment will be described.

Figure 28:
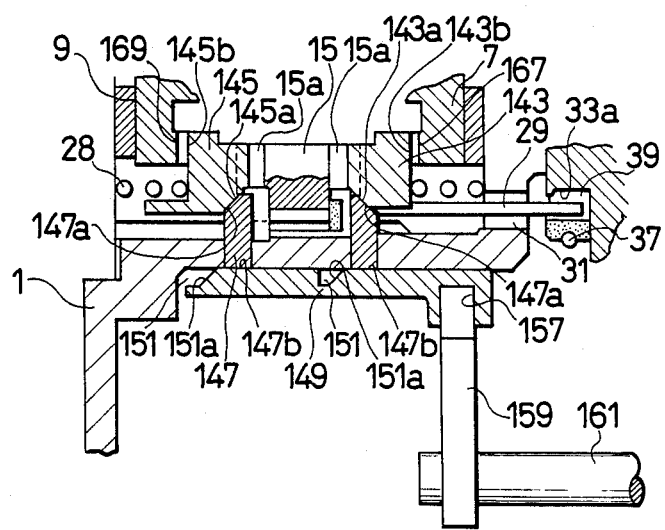
FIG. 28 is a view showing the operation of the ninth embodiment.

If it is desired to use an engine brake in driving a vehicle on a steep downhill road, the operation rod 161 is moved in an arrow direction shown in FIG. 25 by operating the operation lever (not shown). According to the movement of the operation rod 161, the slide ring 149 is moved in the same direction through the fork 159, and the moving members 147 are moved inside the casing 1 as shown in FIG. 28 due to the actions of the slanted faces 151a and the slanted faces 147b. By virtue of the actions of the slanted faces 147a of the moving members 147 and the slanted faces 143a and 145a of the first and second dog clutch members 143 and 145, the first and second dog clutch members 143 and 145 are moved and connected respectively. As a result, both the first and second clutches A and B are connected so that the engine brake can be used on rear wheels side. The first and second clutches A and B which have been manually connected can be released through operations reverse to the above operations.

In addition to the functions realized by the first and eighth embodiments, the ninth embodiment presents effects that the input side and output side can always be connected to each other at need, and that the engine brake is made usable.

What is claimed is:

1. A power transmission apparatus comprising:
an input member for receiving a rotational input;
first and second output means disposed within and rotatably supported with respect to the input member; and
first and second clutch means each disposed within the input member and associated respectively with the first and second output means, said first and second clutch means being operable to connect the input member to the respective first and second output means when the angular velocity of the input member is greater than that of the respective associated first and second output means, and to release the connection between the input member and the respective first and second output means when the angular velocity of the input member is less than the angular velocity of the respective first and second output means; said first and second clutch means respectively comprising:
first and second rotatable clutch members axially shiftable into and out of frictional connection with the respective associated first and second output means; and
cam means for rotatably engaging and axially shifting the first and second clutch members, said cam means having first and second recessed cam surfaces respectively disposed in the first and second clutch members, and first and second projected cam surfaces respectively engageable with the first and second recessed cam surfaces; said apparatus further comprising:
brake means for applying a rotational frictional force to each of the first and second clutch members; and
a return spring means for respectively urging the first and second recessed cam surfaces towards the first and second projected cam surfaces.

2. A power transmission apparatus as claimed in claim 1, wherein said first and second clutch members comprise first and second cone clutch members.

3. A power transmission apparatus as claimed in claim 1, wherein said brake means comprises first and second arm bars respectively connected to the first and second clutch members, brake shoes having a plurality of recessed portions disposed in the circumferential direction thereof and receiving the first and second arm bars and engageable with the first and second arm bars, and a brake holding frame having engaging surfaces slidably fitted to the brake shoes.

4. A power transmission apparatus as claimed in claim 3, wherein said first and second clutch members are rotated with respect to the input member so as to move each of the first and second arm bars from one place to another place with respect to the input member by the frictional resistance between the brake shoes and the engaging surfaces of the brake holding frame.

5. A power transmission apparatus comprising:
an input member for receiving a rotational input;
first and second output means disposed within the input member and rotatably supported with respect to the input member; and
first and second clutch means each disposed within the input member and disposed between the input member and each of the first and second output means, said first and second clutch means being operable to connect the input member to each of the first and second output means when the angular velocity of the input member is greater than the angular velocity of each of the first and second output means, and to release the connection between the input member and each of the first and second output means when the angular velocity of the input member is less than the angular velocity of each of the first and second output means; said first and second clutch means respectively comprising:
first and second dog clutch members each movable with respect to each of the first and second output means and having tapered clutch teeth engageable with each of the first and second output means; and
cam means for engaging with the first and second dog clutch members in the rotational direction thereof by displacing the first and second dog clutch members with respect to the input member, said cam means having first and second recessed cam surfaces respectively disposed in the first and second dog clutch members, and first and second projected cam surfaces respectively engageable with the first and second recessed cam surfaces; said apparatus further comprising:

brake means for applying a rotational frictional force to each of the first and second dog clutch members; and a return spring means for respectively fitting the first and second recessed cam surfaces to the first and second projected cam surfaces.

* * * * *